United States Patent
Suzuki

[11] Patent Number: 6,131,553
[45] Date of Patent: Oct. 17, 2000

[54] INTERNAL COMBUSTION ENGINE HAVING COMBUSTION HEATER

[75] Inventor: Makoto Suzuki, Mishima, Japan

[73] Assignee: Toyota Jidosha Kabushiki Kaisha, Toyota, Japan

[21] Appl. No.: 09/165,222

[22] Filed: Oct. 1, 1998

[30] Foreign Application Priority Data

Oct. 20, 1997 [JP] Japan ..................................... 9-287425
Jun. 15, 1998 [JP] Japan .................................. 10-167555

[51] Int. Cl.$^7$ ........................... F02N 17/06; F02M 35/10
[52] U.S. Cl. ......................................................... 123/556
[58] Field of Search ................................ 123/556, 559.1, 123/550

[56] References Cited

U.S. PATENT DOCUMENTS

| | | |
|---|---|---|
| 2,290,300 | 7/1942 | Spackman . |
| 4,186,560 | 2/1980 | Frankl ..................... 123/556 |
| 4,212,162 | 7/1980 | Kobayashi . |
| 4,625,910 | 12/1986 | Kawamura .............. 123/556 |
| 4,858,825 | 8/1989 | Kawamura . |
| 4,927,077 | 5/1990 | Okada . |
| 5,655,506 | 8/1997 | Hollis ...................... 123/556 |

FOREIGN PATENT DOCUMENTS

| | | |
|---|---|---|
| 1497428 | 12/1967 | France . |
| 2381175 | 9/1978 | France . |
| 4411959 | 10/1995 | Germany . |
| 61-268516 | 11/1986 | Japan .............................. B60H 1/22 |
| 2041081 | 9/1980 | United Kingdom . |
| 1595060 | 8/1981 | United Kingdom . |

OTHER PUBLICATIONS

Patent Abstracts of Japan, vol. 018, No. 600 (P–1826), Nov. 15, 1994 & JP 06 222867 A (Sharp Corp.), Aug. 12, 1994.
Patent Abstracts of Japan, vol. 005, No. 033 (M–057), Feb. 28, 1981 & JP 55 160158 A (Nissan Motor Co., Ltd.), Dec. 12, 1980.
Copending U.S. Patent Application Serial No. 09/204,895, filed Dec. 3, 1998.
Copending U.S. Patent Application Serial No. 09/193,431, filed Nov. 17, 1998.
Copending U.S. Patent Application Serial No. 09/213,799, filed Dec. 17, 1998.
Copending U.S. Patent Application Serial No. 09/213,051, filed Dec. 16, 1998.

*Primary Examiner*—Marguerite McMahon
*Attorney, Agent, or Firm*—Kenyon & Kenyon

[57] ABSTRACT

Disclosed is an internal combustion engine having a combustion heater wherein, in the case of attaching a supercharger to a intake path of the internal combustion engine, the combustion heater provided on a intake path can be surely ignited, and the intake air can be prevented from flowing back within the intake path even when the supercharger operates. The vaporizing type combustion heater is connected in bypass via an air supply path, a combustion chamber body and a burned gas discharging path as components thereof to a intake pipe of the internal combustion engine, through which the intake air flows towards cylinders of the engine. A compressor of a turbo charger is not provided between a connecting point to the air supply path and a connecting point to the burned gas discharging path along the intake pipe.

17 Claims, 6 Drawing Sheets

INTERNAL COMBUSTION ENGINE HAVING COMBUSTION HEATER

BACKGROUND OF THE INVENTION

The present invention relates generally to an internal combustion engine having a temperature rising device for increasing temperatures of related elements and, more particularly, to an internal combustion engine having a combustion heater.

For example, Japanese Patent Application Laid-Open Publication No. 62-75069 discloses a technology of enhancing a starting characteristic of the internal combustion engine and promoting a warm-up thereof in cold seasons by warming up engine cooling water utilizing combustion heat emitted from a combustion heater attached to a intake path of the internal combustion engine.

According to this Patent Application Laid-Open Publication, the combustion heater disclosed therein is attached to the intake path through a intake duct and an exhaust duct. Then, the air required for combustion is supplied from the intake path via the intake duct, and a burned gas is discharged to the intake path via the exhaust duct. The high-heat burned gas emitted from the combustion heater eventually arrives at the internal combustion engine body via the intake pass, and warms up the engine cooling water in a water jacket. Further, along the intake path, a switching valve for opening and closing the intake path is provided between a connecting point to the intake duct and a connecting point to the exhaust duct. This switching valve fully closes before the internal combustion engine is actuated, and, for a short while after the actuation thereof, half-closes (half-opens) or fully opens, thus controlling a quantity of combustion air supply to the combustion heater via the intake duct. This control is intended to promote the warm-up of the internal combustion engine and to enhance the starting characteristic thereof.

Incidentally, in the thus constructed prior art, it can be considered that a compressor of a supercharger is installed between the connecting point to the intake duct and the connecting point to the exhaust duct along the intake path. In this case, however, since the compressor hinders a flow of the intake air, there might be caused a pressure difference between on the upstream-side of the intake path and on the downstream-side thereof at the compressor serving as a boundary. Namely, a pressure on the upstream-side is larger than on the downstream-side. Thereupon, there might be produced a pressure difference between the intake duct connected upstream to the intake path and the exhaust duct connected downstream to the intake path. Then, an excessively large air flow occurs owing to the above pressure difference within the body of the combustion heater connected to the intake path via the intake duct, and the exhaust duct, and hence there might be a possibility in which therefore an ignition characteristic of the combustion heater declines. That is, in the same way as a gas lighter and a match are hard to gain a fire when it's a strong wind, the combustion heater is hard to gain a fire when a velocity of the air flowing within the combustion heater body is high, or if the fire is set, it can be considered that the fire is easily extinguished.

Further, in the case where the compressor is, as in the way described above, attached to the intake path between the connecting point to the intake duct and the connecting point to the exhaust duct along the intake path, when the compressor is operated, a pressure in the vicinity of the compressor on the downstream-side at the compressor serving as the boundary along the intake path, i.e., the pressure on the side of the connecting point between the intake path and the exhaust duct becomes higher due to pressurization than a pressure in the vicinity of the compressor on the upstream-side at the compressor similarly serving as the boundary, i.e., the pressure on the side of the connecting point between the intake path and the intake duct. Therefore, it follows that there is produced a back flow in which the intake air flows back to the intake duct from the exhaust duct also within the combustion heater body connected to the intake path via the intake duct and the exhaust duct. If this back flow is produced, a so-called back fire phenomenon occurs. The back fire phenomenon means that a fire of the combustion heater is directed backward to the intake duct. There might be a possibility in which an accidental fire is caused in the combustion heater, and it can be considered that the internal combustion engine is incapable of obtaining a sufficient quantity of heat from the combustion heater.

SUMMARY OF THE INVENTION

It is a primary object of the present invention, which was contrived under such circumstances, to provide, in an internal combustion engine having a combustion heater, an internal combustion engine having a combustion heater that is capable of surely igniting the combustion heater provided on a intake path even when a supercharger is attached to the intake path of the internal combustion engine and preventing a back flow of intake air within the intake path even when the supercharger operates.

To accomplish the above object, the internal combustion engine having the combustion heater according to the present invention adopts the following construction.

According to a first aspect of the present invention, there is provided an internal combustion engine having a combustion heater comprising a combustion chamber body, an air supply path for supplying said combustion chamber body with the air for combustion, a fuel supply path for supplying the combustion chamber body with a combustion fuel, an ignition device for igniting the combustion fuel supplied into the combustion chamber body via the fuel supply path, and a burned gas discharging path for discharging, out of the combustion chamber body, a burned gas emitted from the combustion fuel burned within the combustion chamber body upon the ignition by the ignition device, the combustion heater operates when the internal combustion engine is in a predetermined operating state, and increases temperatures of engine related elements. The combustion heater is connected in bypass to a intake path of the internal combustion engine through the air supply path, the combustion chamber body and the burned gas discharging path. A supercharger is installed in a portion along the intake path other than between a connecting point to the air supply path and a connecting point to the burned gas discharging path.

"the predetermined operating state of the internal combustion engine" implies some states, at a cold time and at an extremely cold time, where during an operation of the internal combustion engine, after starting the internal combustion engine and exothermic quantity of the internal combustion engine itself is small amount owing to that e.g., a fuel consumption is small.

Further "the predetermined operating state of the internal combustion engine" implies some states where a heat receiving quantity of the cooling water is small amount and a state where a temperature of the cooling water immediately after starting the engine is low even at a normal temperature. The normal temperatures may be temperatures higher than 15°

C. Temperatures at the cold time are −10° C. to 15° C., and temperatures at the extremely cold time are temperatures under −10° C.

"The engine related elements" denotes the internal combustion engine itself in which the burned gas of the combustion heater is taken into the engine cooling water and the intake air.

The supercharger embraces a supercharger wherein the driving source of which is a rotary force of a crank shaft of the internal combustion engine, and a turbo charger wherein the driving source of which is a rotary force of an exhaust turbine by using this exhaust turbine. More specifically, it is a compressor which is a composition of each of these superchargers.

In the internal combustion engine having the combustion heater according to the present invention, the combustion heater is connected in bypass to the intake path via the air supply path, the combustion chamber body and the burned gas discharging path which are components thereof. The supercharger is installed in a portion other than between the connecting point to the air supply path and the connecting point to the burned gas discharging path along the intake path, and hence, along this intake path, no supercharger exists between the connecting point to the air supply path and the connecting point to the burned gas discharging path. Accordingly, it never happens that an excessively large pressure is produced between the air supply path and the burned gas discharging path which are respectively connected to the intake path. Consequently, it never happens that an air velocity becomes excessively high within the combustion heater body connected to the intake path via the air supply path and the burned gas discharging path. Hence, an air blow strong enough to make the combustion heater unable to be ignited is not produced within the combustion chamber body, whereby the combustion heater can be surely ignited.

Further, since the supercharger does not exist between the connecting point to the air supply path and the connecting point to the burned gas discharging path along the intake path, the supercharger never operates at the portion between the both connecting points. Hence, the pressure on the side of the connecting point between the intake path and the burned gas discharging path neither rises nor becomes higher than the pressure on the side of the connecting point between the intake path and the air supply path, and the pressures on both sides are substantially equal. Accordingly, the back flow is not produced within the combustion heater body connected to the intake path via the air supply path and the burned gas discharging path. Hence, it never happens that there appears the back fire phenomenon in which the fire of the combustion heater is directed backward correspondingly to the air supply path, with the result that the internal combustion engine obtains the sufficient heat quantity from the combustion heater without causing any accidental fire in the combustion heater.

Furthermore, the burned gas of the combustion heater, which flows to the intake path via the burned gas discharging path, is led to the cylinders of the internal combustion engine after being mixed with a new gas. The burned gas is re-burned in the cylinders this time as combustion air of the internal combustion engine. Then, the re-burned gas flows out of the exhaust port of the internal combustion engine and arrives at the exhaust path of the internal combustion engine, at which time the re-burned gas is purified by an exhaust catalyst provided normally at the exhaust path.

Note that the air supply path and the burned gas discharging path of the combustion heater are not open directly to the atmospheric air, and hence a noise reducing effect can be expected.

According to a second aspect of the invention, in the internal combustion engine having the combustion heater according to the first aspect of the invention, the combustion heater may be disposed upstream of the installing position of the supercharger along the intake path.

In this case, since the combustion heater exists upstream of the supercharger, it follows that both of the air supply path and the burned gas discharging path which are defined as components of the combustion heater are also positioned upstream of the supercharger. Accordingly, even if there rises a intake pressure at a portion on the downstream side of the installing position of the supercharger along the intake path with an operation of the supercharger, this increased quantity of pressure does not exert an influence upon the connecting point between the intake path and the air supply path and upon the connecting point between the intake path and the burned gas discharging path. Accordingly, no back flow is caused in the combustion heater. Further, intake pulses generated in the cylinders are attenuated by the supercharger and after that the intake pulses propagated to the burned gas discharging path and the air supply path of the combustion heater, whereby there are decreased pressured fluctuations both in the burned gas discharging path and in the air supply path due to the intake pulses. Accordingly, a well-burned state of the combustion heater can be maintained.

According to a third aspect of the invention, in the internal combustion engine having the combustion heater according to the first aspect of the invention, the combustion heater may also be disposed downstream of the installing position of the supercharger along the intake path.

Since the combustion heater is disposed downstream of the supercharger, it follows that both of the air supply path and the burned gas discharging path as the components of the combustion heater are disposed downstream of the supercharger. In this case, however, when the supercharger operates, with this operation, there rises the intake pressure at the downstream side of the installing position of the supercharger along the intake path. This increases quantity of pressure, however, acts evenly on the connecting point to the air supply path and on the connecting point to the burned gas discharging path along the intake path. Accordingly, the pressure at the connecting point to the burned gas discharging path does not become higher than at the connecting point to the air supply path along the intake path, therefore the excessively large pressure difference is not caused between the both connecting points. Consequently, in this case also, no back flow can be seen in the combustion heater.

According to a fourth aspect of the invention, in the internal combustion engine having the combustion heater according to the second aspect of the invention, a intake air cooler for cooling the intake air within the intake path holding heat due to pressurization by the supercharger may be installed along the intake path at a portion other than between the connecting point to the air supply path and the connecting point to the burned gas discharging path. Herein, an inter cooler may be exemplified as "the intake air cooler". As in the case of the supercharger, if the inter cooler is installed on the intake path, a flow of the intake air is hindered by the inter cooler as the intake resistor because of its existing on the intake path. Consequently, there might be a difference between the upstream-side pressure and the downstream-side pressure at the inter cooler serving as a boundary.

Thus, the intake air cooler for cooling the intake air within the intake path holding heat due to pressurization by the supercharger is installed along the intake path at the portion other than between the connecting point to the air supply path and the connecting point to the burned gas discharging path. No intake air cooler exists between the connecting point to the air supply path and the connecting point to the burned gas discharging path along the intake path. Hence, no excessively large pressure difference occurs between the air supply path and the burned gas discharging path which are each connected to the intake path. Therefore, the air velocity does not become excessively high within the combustion heater body connected to the intake path via the air supply path and the burned gas discharging path, and consequently there is no possibility in which the air blow strong enough to make the combustion heater unable to be ignited is produced within the combustion chamber body.

Further, if the inter cooler is adopted as the intake air cooler, generally a inter cooler normally belongs to the supercharger and is not therefore conceived as a special equipment. This results in a decrease in costs.

According to a fifth aspect of the invention, in the internal combustion engine having the combustion heater according to the third aspect of the invention, a intake air cooler for cooling the intake air within the intake path holding heat due to pressurization by the supercharger may be installed along the intake path at a portion other than between the connecting point to the air supply path and the connecting point to the burned gas discharging path.

According to sixth aspect of the invention, in the internal combustion engine having the combustion heater according to the fifth aspect of the invention, the intake air cooler may be disposed more upstream along the intake path than the connecting point to the burned gas discharging path.

In this case, the burned gas flowing to the intake path from the burned gas discharging path is not cooled by the intake air cooler. Hence, the burned gas having a comparatively high temperature can be led into the internal combustion engine, so that the warm-up characteristic of the internal combustion engine can be enhanced.

According to seventh aspect of the invention, in the internal combustion engine having the combustion heater according to the fifth aspect of the invention, the intake air cooler may be disposed more downstream along said intake path than the connecting point to the burned gas discharging path.

In this case, the burned gas is cooled by the intake air cooler, and hence there is no serious concern about a thermal damage to the suction system structures, which is due to an excessive rise in the intake air temperature.

According to a eighth aspect of the invention, in the internal combustion engine having the combustion heater according to the seventh aspect of the invention, the intake path may include a bypass passageway for bypassing the intake air cooler, and the burned gas of the combustion heater may be led to the internal combustion engine body via the bypass passageway when the internal combustion engine is in the predetermined operating state.

With this construction, when the internal combustion engine is in the predetermined operating state, i.e., when an outside air temperature is under a predetermined value, the burned gas of the combustion heater flows not through the intake air cooler but through the bypass passageway and arrives at the internal combustion engine body, and therefore the burned gas remains in an as-warmed state without being cooled by the intake air cooler. Accordingly, this is suitable for promoting the warm-up at a cold time.

According to an ninth aspect of the invention, the internal combustion engine having the combustion heater according to the eighth aspect of the invention may further comprise a burned gas flow direction switching device for leading the burned gas of the combustion heater to the bypass passageway.

According to a tenth aspect of the invention, in the internal combustion engine having the combustion heater according to the ninth aspect of the invention, the burned gas flow direction switching device may be constructed of a valve member for closing the bypass passageway and a rotary shaft thereof, and opens and closes the bypass passageway corresponding to when the internal combustion engine is in the predetermined operating state and when not.

According to a eleventh aspect of the invention, the internal combustion engine having the combustion heater according to the second aspect of the invention may further comprise a heater control unit for stopping an operation of the combustion heater at a non-cold time.

With this construction, at the non-cold time, e.g., when the outside air temperature is high, since the operation of the combustion heater stops, the intake air coming from the atmospheric air, which enters the intake path of the internal combustion engine, is not warmed up by the heat of the burned gas of the combustion heater. Accordingly, there is no serious concern about the thermal influence upon the suction system structures, which is derived from the intake air temperature becoming too high, and no trouble happens in the supercharger due to the heat held by the high-temperature intake air.

In other words, at the cold time, the intake air entering the internal combustion engine can be set at a proper temperature by mixing the air in the cold atmospheric air with the air warmed up by the combustion heater. If the combustion heater is made to function also at the non-cold time, however, the thermal damage might exert an influence thereupon on the contrary, and hence the operation of the combustion heater is stopped at the non-cold time in order to prevent the thermal damage.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be discussed with reference to the accompanying drawings.

First Embodiment

A first embodiment of the present invention will be explained with reference to FIGS. 1 and 2.

(Construction of Engine 1)

An engine 1 serving as an internal combustion engine is classified as a water cooling type engine, and includes an engine body 3 having a water jacket containing engine cooling water, a intake device 5 for sending air necessary for combustion into a plurality of unillustrated cylinders of the engine body 3, an exhaust device 7 for discharging, into the atmospheric air, an exhaust gas after a mixed gas has ben burned, and a car room heater 9 for heating an interior of the room in a vehicle mounted with the engine (Construction of Intake Device 5)

The intake device 5 includes an air cleaner 13, serving as a starting end of the device 5, for taking fresh air into the cylinders, and an unillustrated intake port, serving as a terminal thereof, of the engine body 3. Then, in a span between the cir cleaner 13 and the intake port, the intake device 5 has a compressor 15a of a turbo charger 15 defined as a supercharger, a combustion heater 17 for heating the sucked air at a cold time, an inter cooler 19 for cooling the air flowing, downstream of an installing position of the compressor 15a, within a intake pipe 23 receiving the heat generated by pressurization of the compressor 15a, and an intake manifold 21 for allocating a mixed gas coming via the inter cooler 19 to the respective cylinders.

Then, constructive members of the intake device 5 are connected to each other through a plurality of connection pipes belonging to the intake pipe 23, which are explained as follows.

(Construction of Intake Pipe 23)

The intake pipe 23 consisting essentially of the plurality of connection pipes may be roughly classified at the compressor 15a serving as a boundary into downstream-side connection pipes 27 brought into a pressurized state by forcibly intruding thereinto the intake air coming in the intake device 5, and downstream-side connection pipes 25 not brought into this state.

(Construction of Upstream-Side Connection Pipe 25)

Figure 1:
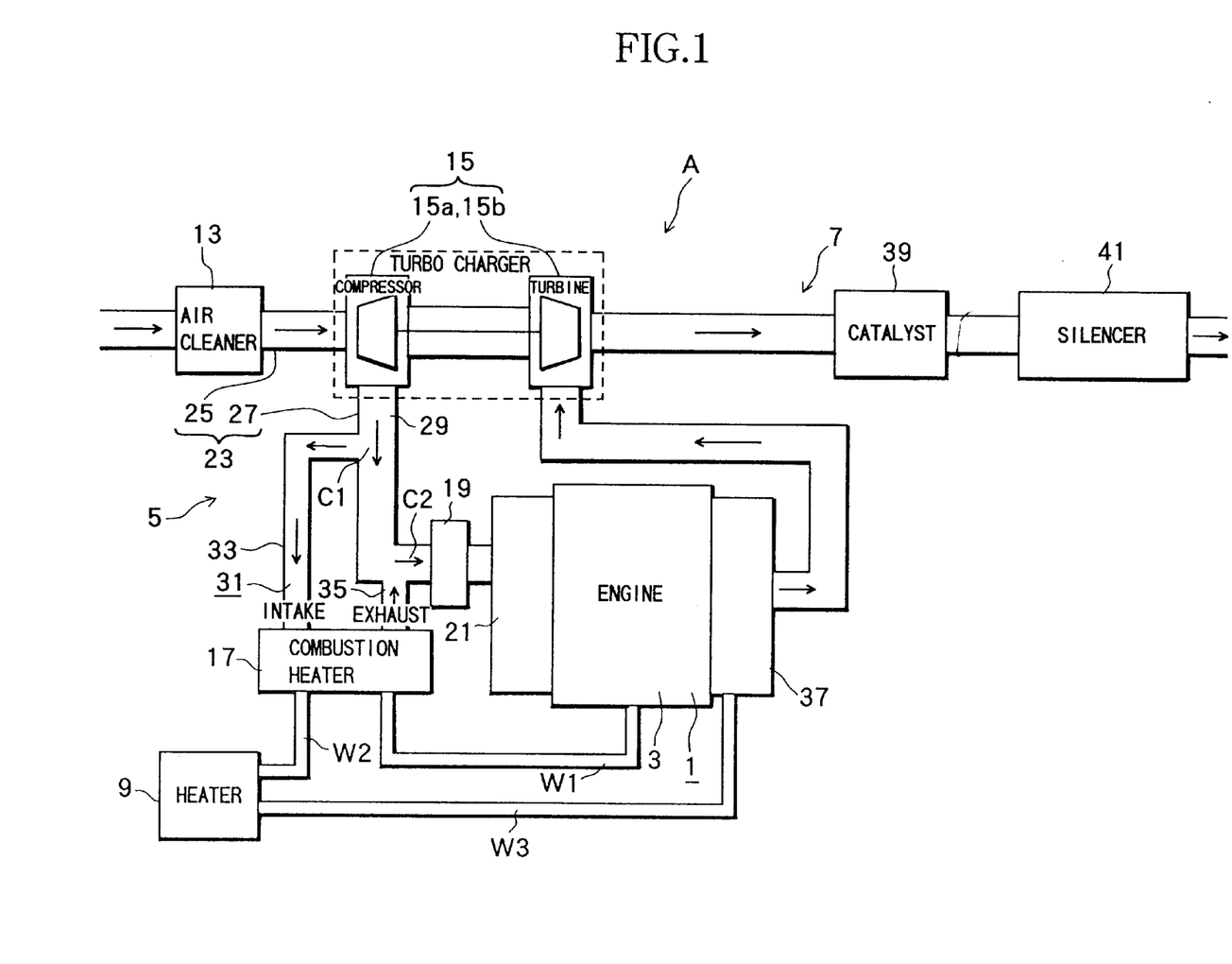
FIG. 1 is a diagram schematically showing a construction of an internal combustion engine having a combustion heater in a first embodiment of the present invention.
Figure 2:
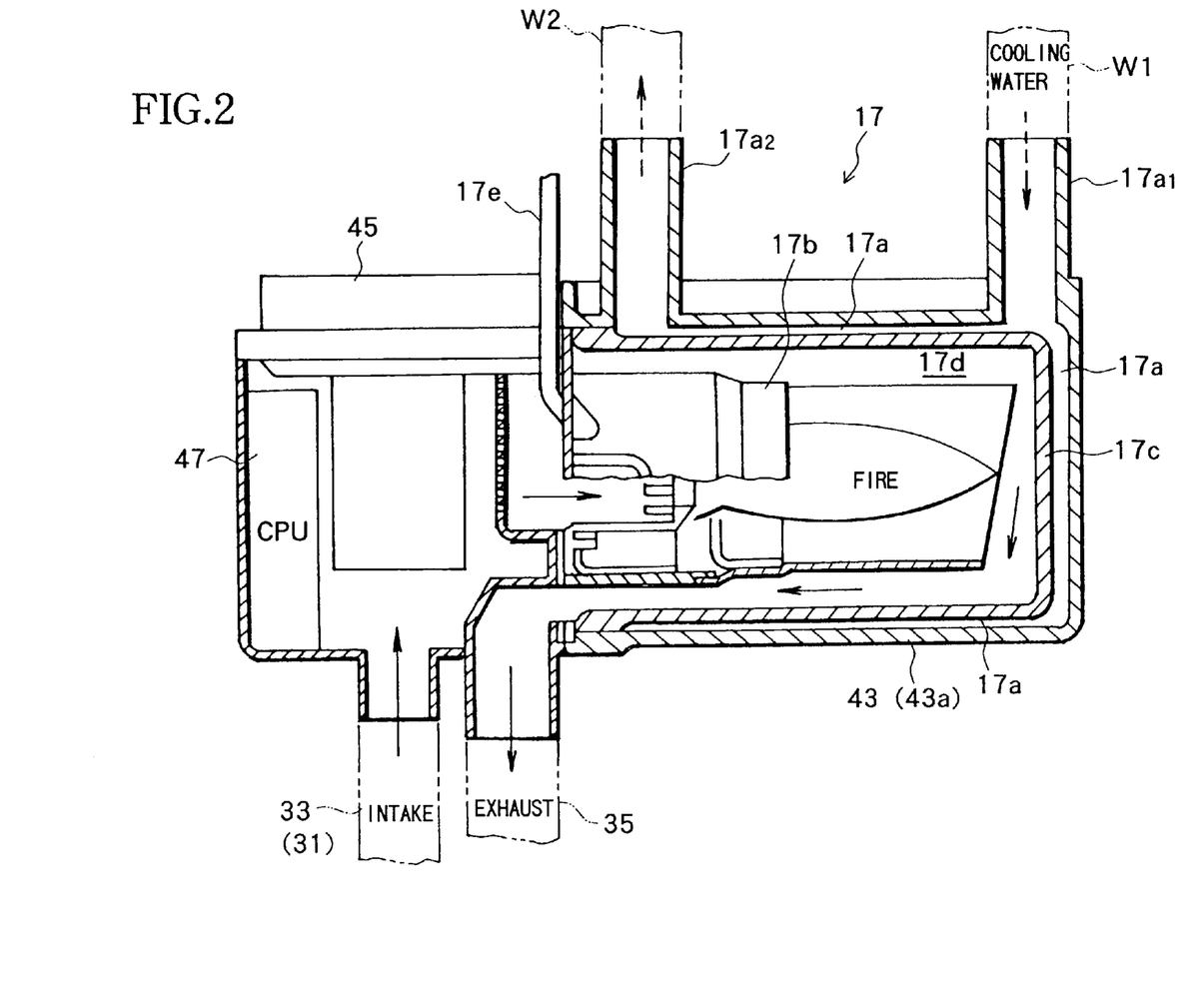
FIG. 2 is a schematic sectional view showing the combustion heater.

The upstream-side connection pipe 25 is a rod-like connection pipe, through which the air cleaner 13 is connected to the compressor 15a, extending in bilateral directions in FIG. 1.

(Construction of Downstream-side Connection Pipe 27)

The downstream-side connection pipe 27 consists essentially of a main pipe 29, through which the compressor is connected to the intake manifold 21, extending in vertical directions in FIG. 1 and assuming substantially L-shape, and a heater branch pipe 31 defined as a tributary pipe connected in bypass to the main pipe 29.

(Construction of Heater Branch Pipe 31)

The heater branch pipe 31 includes the combustion heater 17 midways thereof, an air supply path 33, through which an upstream-side end of the combustion heater 17 is connected to the main pipe 29, for supplying the combustion heater 17 with the air, and a combustion gas discharging path 35, through which a downstream-side end of the combustion heater 17 is connected to the main pipe 29, for discharging a burned gas of the combustion heater 17 into the main pipe 29. Further, there are two points C1, C2 as for connecting points between the air supply path 33, the burned gas discharging path 35 and the main pipe 29, the connecting point C1 is positioned more upstream of the main pipe 29 than the connecting point C2. Note that the connecting point C2 of the burned gas discharging path 35 to the main pipe 29 is positioned upstream in the vicinity of the inter cooler 19.

Hence, a part of the intake air passing through the main pipe 29 diverges at the connecting point C1 into the heater branch pipe 31, and the rest of the intake air flows straight through the main pipe 29 without divergence. Then, the intake air diverging into the heater branch pipe 31 flows back at the connecting point C2 to the main pipe 29 via a route such as the air supply path 33—the combustion heater 17—the burned gas discharging path 35, and becomes confluent with the undivergent intake air. As a result, a temperature of the intake air entering the engine body 3 is increased.

(Construction of Exhaust Device 7)

In a span between an unillustrated exhaust port, serving as a starting end of the exhaust device 7, of the engine body 3 and a silencer 41 as a terminal thereof, the exhaust device 7 includes an exhaust manifold 37, a turbine 15b of the turbo charger 15 and an exhaust catalyst 39. These elements are already known and not directly related to the present invention, and therefore their explanations are omitted.

(Construction of Combustion Heater 17)

Next, a structure of the combustion heater 17 is schematically shown.

The combustion heater 17 operates when the engine 1 remains in a predetermined operating state, and is thus intended to increase a temperature of the engine cooling water. Hence, the combustion heater 17 is connected to the water jacket containing the engine cooling water. The combustion heater 17 therefore embraces a cooling water path 17a through which the engine cooling flows. This cooling water path 17a is warmed up by the burned gas flowing round inside a combustion chamber 17d defined as a heat source. Further, the "predetermined operating state" described above may be states, at a cold time when at temperatures $-10°$ C. to $15°$ C. and an extremely cold time when at $-10°$ C. or under, where during an operation of the internal combustion engine, after starting the internal combustion engine and exothermic quantity of the internal combustion engine itself is small amount owing to that e.g., a fuel consumption is small, and a state where a heat receiving quantity of the cooling water is small due to the above exothermic quantity being small, or a state where the cooling water temperature is low immediately after the start of the internal combustion engin at a normal temperature higher than $15°$ C.

(Construction of Combustion Chamber 17d)

The combustion chamber 17d is constructed such that a combustion cylinder 17b is disposed there and is covered with a cylindrical partition wall 17c. The combustion chamber 17d is defined within a case body 43a of a combustion chamber body 43 by covering the combustion cylinder 17b with the partition wall 17c, and the cooling water path 17a is formed between an internal surface of the case body 43a and an external surface of the partition wall 17c.

The combustion chamber 17d functions also as an intra-heater air path, and is therefore connected to the burned gas discharging path 35 as well as being connected to the air supply path 33 of the combustion heater 17. Then, as explained above, the intake air diverges from the main pipe 29 and passes through the heater branch pipe 31. Thereafter, as indicated by solid-line arrows in FIG. 2, the intake air flows to the main pipe 29 via the route such as the air supply path 33—the combustion chamber 17d—the burned gas discharging path 35. And when the combustion heater 17 burns, the intake air after through the combustion chamber 17d includes the burned gas of the combustion heater 17. Then, the intake air is warmed up by the burning heat of the burned gas, and hence this warmed intake air, during a period till the intake air is discharged from the combustion chamber body 43 via the route indicated by the solid-line arrows, warms up as a heat medium the cooling water flowing through the cooling water path 17a. Therefore, the combustion chamber 17d may also be referred to as a heat exchange path.

(Construction of Combustion Cylinder 17b)

The combustion cylinder 17b is supplied with a combustion fuel via a fuel supply pipe 17e serving as a fuel supplying path. When the combustion fuel is supplied to the combustion chamber 17d therefrom, the fuel is vaporized within the combustion chamber body 43. Then, the vaporized fuel is ignited by an unillustrated ignition device, whereby the vaporized fuel is burned.

(Construction of Cooling Water Path 17a)

On the other hand, the cooling water path 17a includes a cooling water inlet 17a1 and a cooling water outlet 17a2. The cooling water inlet 17a1 is, as seen in FIG. 1, connected via a water conduit W1 to a cooling water outlet of the unillustrated water jacket of the engine body 3.

(Construction of Cooling Water Outlet 17a2)

Further, the cooling water outlet 17a2 is connected via a water conduit W2 to the car room heater 9. Then, the car room heater 9 is connected via a water conduit W3 to a cooling water inlet of the water jacket of the engine body 3.

Accordingly, the cooling water in the water jacket is, when reaching the combustion heater 17 via the water conduit W1, warmed up there, and thereafter arrives at the car room heater 9 through the water conduit W2 from the combustion heater 17. The water is subjected to a heat exchange as a heat medium of the car room heater 9. Thus hot air from the car room heater 9 flows inside the car room. The cooling water having decreased in temperature through the heat exchange flows back to the water jacket via the water conduit W3. Thus, the cooling water is circulated via the water conduits W1–W3 between the engine body 3, the combustion heater 17 and the car room heater 9.

(Other Components of Combustion Heater 17)

Note that the combustion chamber body 43 has, in addition to the above components, an air blowing fan 45, and a central processing control unit (CPU) 47 belonging to an unillustrated engine electronic control unit (ECU), and the combustion heater 17 are preferably operated by these elements.

(Others)

Further, the air supply path 33 and the burned gas discharging path 35 are tributary pipes from the main pipe 29 which belong to the intake pipe 23 but may be, because of they being applied to only the combustion heater 17, conceived as components of the combustion heater 17.

Then, a point to which the attention should be paid about the combustion heater 17 is that the compressor 15a of the turbo charger 15 is not provided between the connection points C1, C2. In other words, the compressor 15a is installed in a portion other than between the connecting points C1, C2. Then, in accordance with the first embodiment, the combustion heater 17 is disposed downstream of the installing portion of the compressor 15a.

What is constructed of as explained so far is an internal combustion engine A having the combustion heater in the first embodiment.

Operation and Effect in First Embodiment

Next, an operation and effect of the internal combustion engine A including the combustion heater will be described.

In the internal combustion engine A having the combustion heater, the combustion heater 17 is connected in bypass to the intake path 29 via the air supply path 33, the combustion chamber body 43 and the burned gas discharging path 35 in this sequence, which are components thereof. The compressor 15a of the turbo charger 15 is not provided between the connecting point C1 to the air supply path 33 and the connecting point C2 to the burned gas discharging path 35 on the intake path 29. Namely, the combustion heater 17 is disposed downstream of the installing portion of the compressor 15a, and hence there is caused no large pressure difference between on the side of the air supply path 33 and on the side of the burned gas discharging path 35, wherein the combustion chamber body 43 of the combustion heater 17 is centered. Therefore, an air velocity in the combustion chamber body 43 connected to the main pipe 29 via the air supply path 33 and the burned gas discharging path 35 as well, does not become excessive. Hence, there is no such possibility that an air blow strong enough to make the combustion heater 17 unable to be ignited might be produced in the combustion chamber body 43, and consequently the ignition of the combustion heater 17 can be surely done.

Further, there does not exist the compressor 15a in the portion between the connecting point C1 to the air supply path 33 and the connecting point C2 to the burned gas discharging path 35 on the main pipe 29. Hence, the compressor 15a doesn't operate at the portion between C1, C2 along the main pipe 29. Therefore neither only a pressure on the side of the connecting point C2 increases, nor a pressure on the side of the connecting point C1 becomes lower than the former, and the pressures on both sides are substantially equal. Therefore, it never happens that a back flow is produced within the combustion chamber 17d of the combustion heater 17 connected to the main pipe 29 via the air supply path 33 and the burned gas discharging path 35. Accordingly, it also never happens that a back fire phenomenon occurs, wherein a fire of the combustion heater 17 is directed backward correspondingly to the air supply path 33. Hence, the engine 1 is capable of obtaining a sufficient quantity of heat from the combustion heater 17 without causing any accidental fire in the combustion heater 17.

Moreover, since the combustion heater 17 is disposed downstream of the compressor 15a, both of the air supply path 33 and the burned gas discharging path 35 as the components of the combustion heater 17, are located downstream of the compressor 15a. Incidentally, in this case, when the compressor 15a operates, a intake pressure existing downstream of the installing portion of the compressor 15a on the main pipe 29 rises with the operation of the compressor 15a. This increased quantity of pressure acts uniformly upon the connection point C1 to the air supply path 33 and the connecting point C2 to the burned gas discharging path 35 on the main pipe 29. Hence, it never happens that there is caused no such pressure difference between the connecting points C1 and C2 that the pressure at the connecting point C1 becomes smaller than at the connecting point C2. Accordingly, the so-called back fire phenomenon never occurs.

Further, the burned gas of the combustion heater 17 which flows through the main pipe 29 via the burned gas discharging path 35 is, after being mixed with a new gas at the connecting point C2, led to the unillustrated cylinders of the engine 1 and again burned therein. Then, the re-burned gas is, when arriving at the exhaust device 7 of the engine 1, purified by an exhaust catalyst 39 provided in the exhaust device 7.

Note that the air supply path 33 and the burned gas discharging path 35 of the combustion heater 17 are open to the main pipe 29 but are not open directly to the atmospheric air, and therefore a noise reducing effect can be expected.

Moreover, since the warm-up is promoted by utilizing the burned gas of the combustion heater 17 containing almost no smoke, in other words, no carbon, the carbon is not adhered to the internal walls of the cylinders, and an enhancement of durability can be therefore expected of the engine 1.

Furthermore, the inter cooler 19 serving as a intake resisting member is provided between the engine body 3 and the connecting point C2 between the burned gas discharging path 35 and the main pipe 29. In other words, the inter cooler 19 exists in the portion other than between the connecting point C1 to the air supply path 33 and the connecting point C2 to the burned gas discharging path 35. Accordingly, along the main pipe 29, the inter cooler 19 does not exist between the connecting points C1 and C2 on the main pipe 29. Hence, it never happens that the excessive pressure difference is produced between the burned gas discharging path 35 and the air supply path 33 which are connected to the main pipe 29. Consequently, the air velocity does not become excessive within the combustion chamber 17d of the combustion heater 17 connected to the main pipe 29 via the air supply path 33 and the burned gas discharging path 35, and hence there is no such possibility that the air blow strong enough to make the combustion heater 17 unable to be ignited is produced in the combustion chamber 17d. Accordingly, the combustion heater 17 is surely ignited.

Moreover, since the burned gas coming out of the burned gas discharging path 35 is cooled of by the inter cooler 19, there is no influence by a thermal damage due to the fact that the temperature of the intake air entering the cylinders from the intake port is excessively high.

Further, the inter cooler 19 is normally attached to the supercharger and is not therefore treated as a special equipment. Hence, the costs can be reduced down.

Second Embodiment

A second embodiment of the present invention will be discussed referring to FIGS. 3 and 4.

A difference of the second embodiment from the first embodiment is only such a point that the burned gas discharging path 35 is provided with a bypass passageway 49 connected in bypass to the main pipe 29 with respect to the inter cooler 19, and that there is provided a burned gas flow direction switching device 51 for switching a flow direction of the burned gas of the combustion heater 17. At the cold time, the switching device 51 is switched over to the engine body 3 not through the inter cooler 19 but through the bypass passageway 49. The same other components are therefore marked with the like numerals, and the explanations thereof are omitted.

Figure 3:
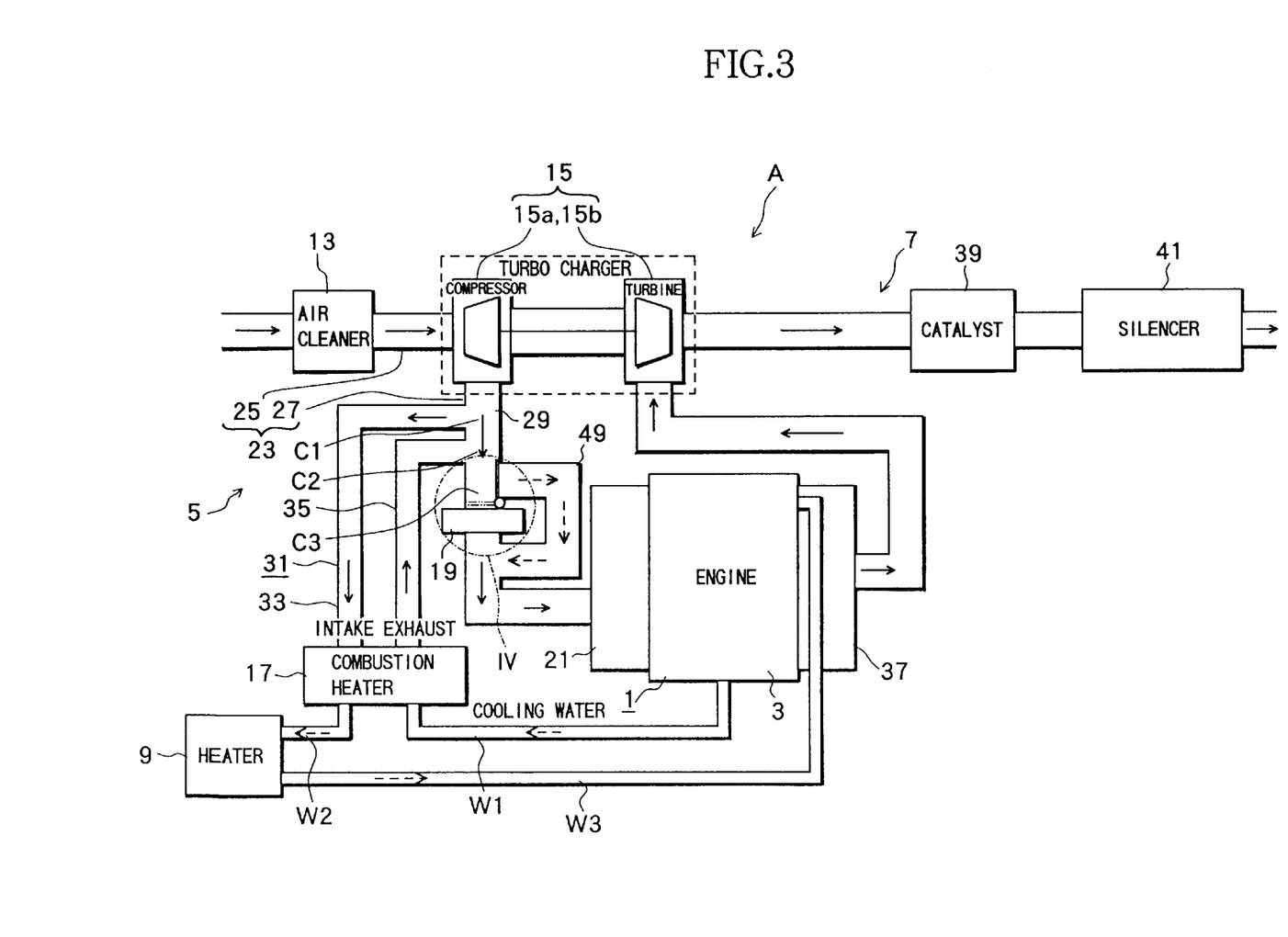
FIG. 3 is a diagram schematically showing a construction of the internal combustion engine having the combustion heater in a second embodiment of the present invention.
Figure 4:
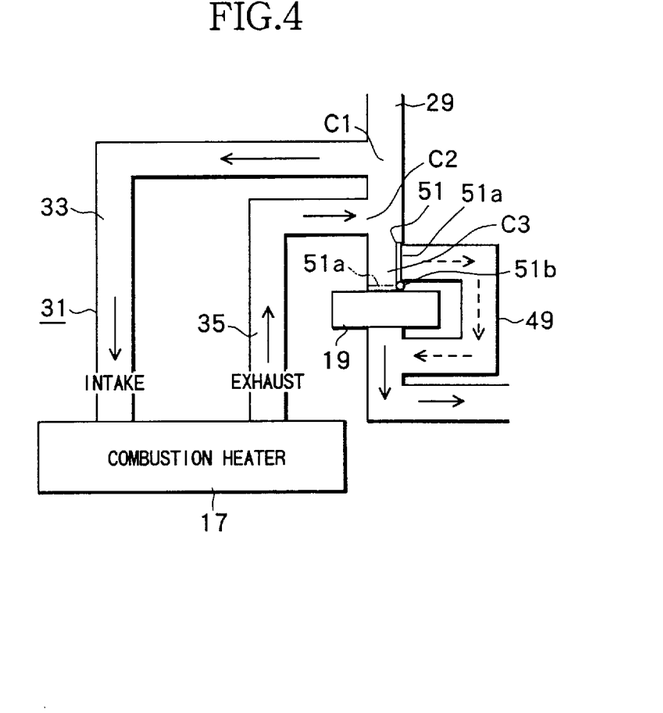
FIG. 4 is an enlarged view showing an area IV in FIG. 3.

The bypass passageway 49 takes substantially a reversed C-shape in FIGS. 3 and 4, and is connected in bypass to the main pipe 29 so as to stride over the inter cooler 19.

Further, a connecting point C3 of the bypass passageway 49 to the main pipe 29 is provided with the burned gas flow direction switching device 51. The point C3 is positioned upstream than the installing position of the inter cooler 19.

The burned gas flow direction switching device 51 is, as illustrated in FIG. 4, constructed of a valve member 51a and a rotary shaft 51b thereof. The ECU performs automatic control so that the valve member 51a rotates about the rotary shaft 51b corresponding to the cold time and the non-cold time with the result that the bypass passageway 49 automatically opens and closes.

More specifically, when cold, the valve member 51a is positioned as shown by a two-dotted line in FIG. 4 and opens the bypass passageway 49, and the burned gas of the combustion heater 17 enters the bypass passageway 49. Further, when not cold, the valve member 51a is positioned as indicated by a solid line in FIG. 4 and closes the bypass passageway 49, and the burned gas of the combustion heater 17 flows through the inter cooler 19.

Operation and Effect in Second Embodiment

The second embodiment exhibits the following operation and effect in addition to the same operation and effect as those in the first embodiment.

At the cold time, the burned gas of the combustion heater 17, as indicated by broken-line arrows in FIG. 4, passes through the bypass passageway 49 and enters the engine body 3 from the intake manifold 21 without flowing via the inter cooler 19. Therefore, the warm-up can be promoted at the cold time, and the working of the car room heater 9 can be speeded up.

By contrast, when not cold, for example, when the temperature of the outside air is high, the burned gas of the combustion heater 17, as indicated by the solid-line arrows in FIG. 4, passes through the inter cooler 19 and, after being thus temporarily cooled therein, flows to the engine body 3. It is therefore feasible to prevent the structures of the intake path from being damaged due to the thermal influence etc when the intake air temperature is too high.

Third Embodiment

Figure 5:
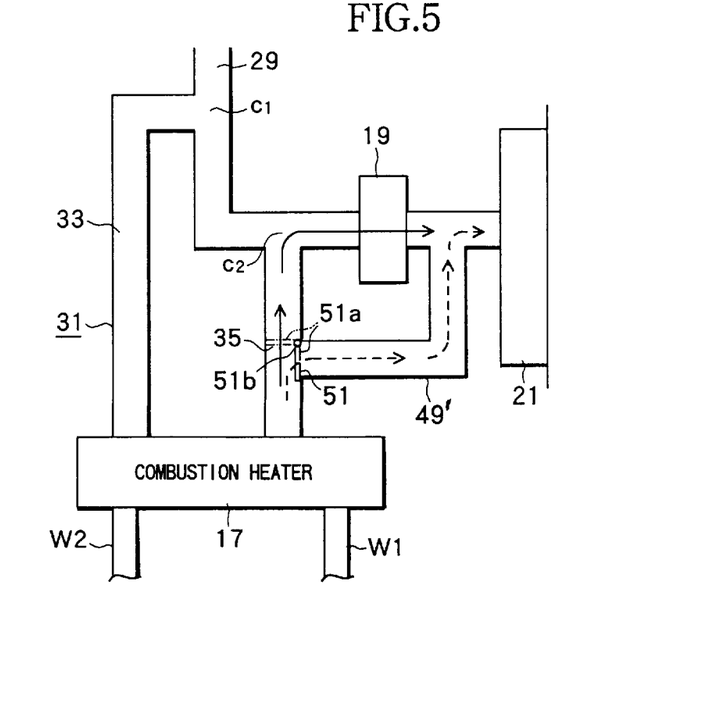
FIG. 5 is a diagram schematically showing a construction of the internal combustion engine having the combustion heater in a third embodiment of the present invention.

A difference of a third embodiment from the second embodiment is a position where the bypass passageway is attached.

A bypass passageway 49' in the third embodiment bypasses the inter cooler 19 in such a state that upstream- and downstream-side ends of the bypass passageway 49' are connected to the burned gas discharging path 35 and the main pipe 29 respectively. Further, the burned gas flow direction switching device 51 is attached to the upstream-side end of the bypass passageway 49'.

Operation and Effect in Third Embodiment

The third embodiment exhibits the same operation and effect as those in the second embodiment.

Fourth Embodiment

Figure 6:
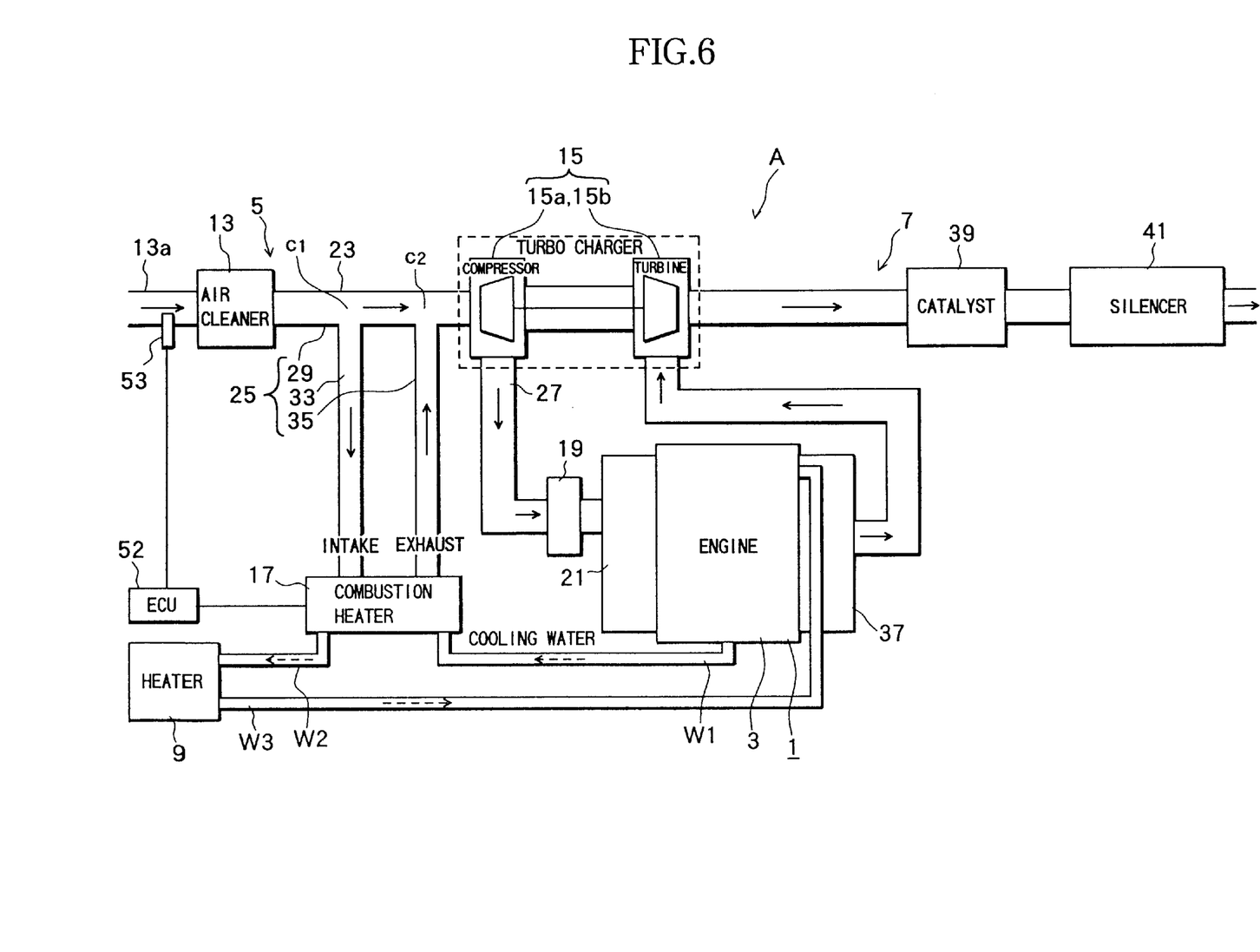
FIG. 6 is a diagram schematically showing a construction of the internal combustion engine having the combustion heater in a fourth embodiment of the present invention.

A forth embodiment will be explained with reference to FIG. 6.

Differences of the fourth embodiment from the first embodiment are only a disposition of the combustion heater 17 and portions related to the heater 17, and hence the same components are marked with the like numerals with an omission of the explanations thereof.

In the fourth embodiment, the combustion heater 17 is disposed upstream of the installing position of the compressor 15a of the turbo charger 15 along the upstream-side connecting pipe 25 of the intake pipe 23. Therefore, the downstream-side connecting pipe 27 in the first embodiment is single, while the upstream-side connecting pipe 25, because of the combustion heater 17 being provided at the upstream-side connecting pipe 25, consists of a plurality of pipes.

To be more specific, the up-stream-side connecting pipe 25 includes the main pipe 29 extending straight toward the compressor 15a of the turbo charger 15 from the air cleaner 13, the air supply path 33 and the burned gas discharging path 35 which are defined as tributary pipes of the main pipe 29 as well as being components of the combustion heater 17.

Further, in the internal combustion engine A having the combustion heater in the third embodiment, an ECU 52 serving as a heater control unit stops the operation of the combustion heater 17 when not cold. A judgement about whether it is cold or not is made by an outside air temperature sensor 53 fitted to, e.g., an air duct 13a existing in the vicinity of the air cleaner 13, and the CPU 47 of the combustion heater 17 controls the operation of the combustion heater 17 in accordance with parameters of the outside air temperature sensor 53.

Operation and Effect in Fourth Embodiment

The fourth embodiment also exhibits the following operation and effect in addition to the same operation and effect as those in the first embodiment.

In the fourth embodiment, the combustion heater 17 is disposed more upstream than the installing position of the compressor 15a of the turbo charger on the main pipe 29, so that both of the air supply path 33 and the burned gas discharging path 35 as the components of the combustion heater 17 are positioned more upstream than the compressor 15a. Accordingly, even when the intake air pressure existing downstream of the installing position of the compressor 15a rises with the operation of the compressor 15a, this increased quantity of pressure does not exert an influence upon the connecting point C1 between the main pipe 29 and the air supply path 33 and upon the connecting point C2 between the main pipe 29 and the burned gas discharging path 35, which are located more upstream than the compressor 15a. Accordingly, the back flow is not caused in the combustion heater 17.

Furthermore, the combustion heater 17 is disposed upstream of the compressor 15a and is not therefore influenced by the pressure of the compressor 15a. Hence, the high durability is not required of the combustion heater 17.

Moreover, since the ECU 52 as the heater control unit stops the operation of the combustion heater 17 at the non-cold time, the operation of the combustion heater 17 is halted at the non-cold time, e.g., when the temperature of the outside air is high.

With this contrivance, when the temperature of the outside air is high, the intake air supplied from the atmospheric air is not warmed up by the heat of the burned gas of the combustion heater 17. Therefore, neither a fuel efficiency declines due to the intake air temperature becoming too high, nor the compressor 15a falls into a trouble caused by the heat held by the high-temperature intake air.

In other words, the intake air entering the engine body 3 can be set at a proper temperature by mixing the air in the cold atmospheric air with the air warmed up by the combustion heater 17. If the combustion heater is made to function at the non-cold time, however, this might results in the trouble on the contrary. This can be, however, prevented by stopping the operation of the combustion heater 17 at the non-cold time.

Fifth Embodiment

Figure 7:
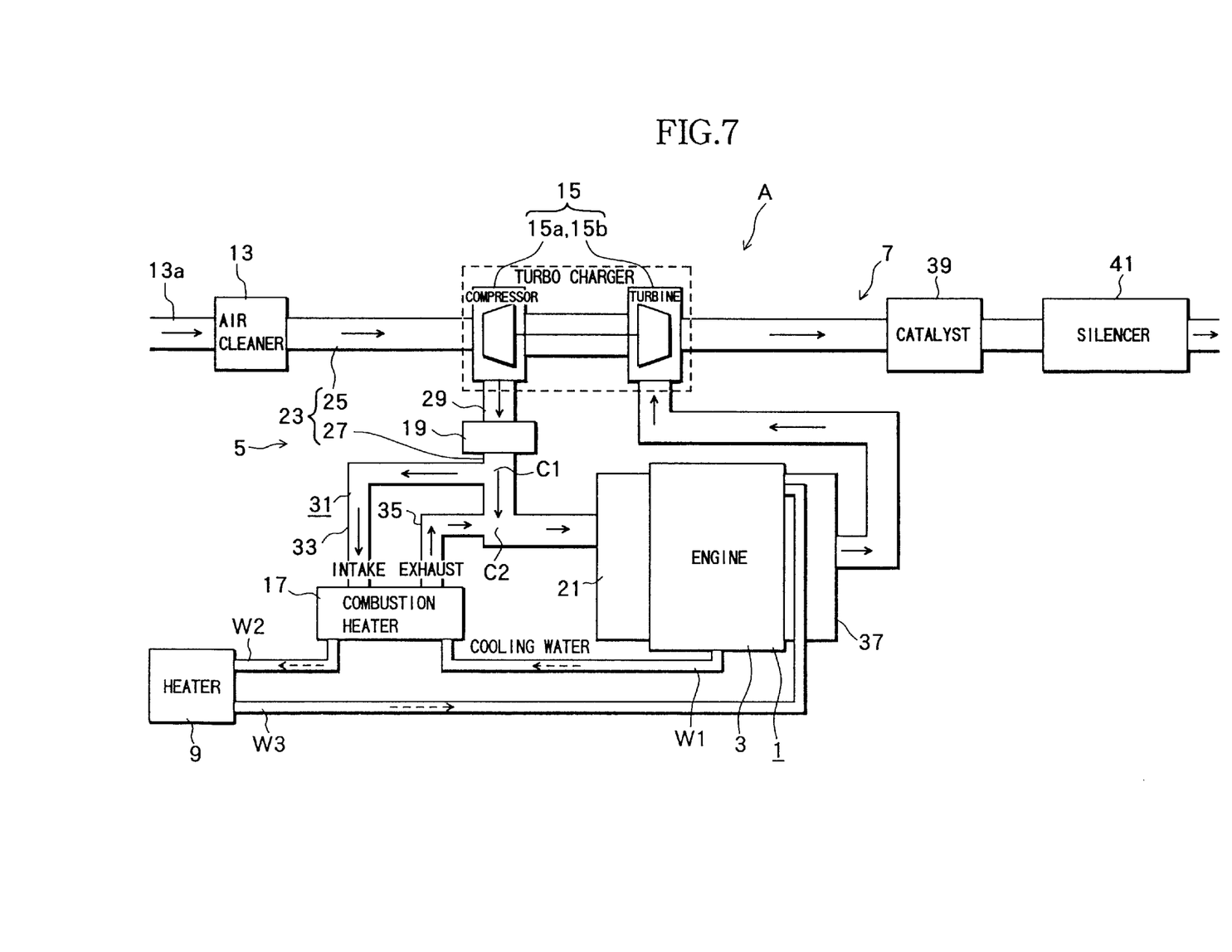
FIG. 7 is a diagram schematically showing a construction of the internal combustion engine having the combustion heater in a fifth embodiment of the present invention.

A fifth embodiment will be explained referring to FIG. 7.

A substantial difference of the fifth embodiment from the first embodiment is only a disposition of the inter cooler 19, and the same other portions are marked with the like numerals with an omission of the explanations thereof.

In the fifth embodiment, the inter cooler 19 is disposed between the installing position of the compressor 15a of the turbo charger 15 and the connecting point C1 between main pipe 29 and the air supply path 33 along the main pipe. In other words, along the main pipe 29, the inter cooler 19 is disposed more upstream than the connecting point C2 to the burned gas discharging path 35.

Operation and Effect in Fifth Embodiment

In the fifth embodiment, along the intake path 29, the compressor 15a of the turbo charger 15 and the inter cooler 19 are not provided between the connecting point C1 to the air supply path 33 and the connecting point C2 to the burned gas discharging path 35, and hence the same operation and effect as those in the first embodiment are exhibited.

Moreover, the burned gas entering the main pipe 29 from the burned gas discharging path 35 is not cooled by the inter cooler 19. Accordingly, the burned gas having a comparatively high temperature can be led into the engine body 3, whereby the warm-up characteristic of the engine 1 can be enhanced.

As discussed above, according to the present invention, even in such a case that the supercharger is attached to the intake path of the internal combustion engine, the combustion heater provided on the intake path can be surely ignited, and the intake air can be prevented from flowing back through the intake path even when the supercharger operates.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater comprising:

a combustion chamber body;

an air supply path for supplying said combustion chamber body with the air for combustion;

a fuel supply path for supplying said combustion chamber body with a combustion fuel;

an ignition device for igniting the combustion fuel supplied into said combustion chamber body via said fuel supply path; and a burned gas discharging path for discharging, out of said combustion chamber body, a burned gas emitted from the combustion fuel burned within said combustion chamber body upon the ignition by said ignition device, said combustion heater operating when said internal combustion engine is in a predetermined operating state and increasing temperatures of engine related elements, wherein said combustion heater is connected in bypass to an intake path of said internal combustion engine through said air supply path and said burned gas discharging path, a supercharger is installed in a portion along said intake path other than between a connecting point to said air supply path and a connecting point to said burned gas discharging path, said combustion heater is disposed more upstream along said intake path than the installed position of said supercharger, and the burned gas emitted from the combustion heater is caused to flow to the intake path through the burned gas discharging path, when the internal combustion engine is in the predetermined operating state.

2. An internal combustion engine having a combustion heater according to claim 1, wherein an intake air cooler for cooling the intake air within said intake path holding heat due to pressurization by said supercharger is installed along said intake path at a portion other than between the connecting point to said air supply path and the connecting point to said burned gas discharging path.

3. An internal combustion engine having a combustion heater according to claim 2, wherein said intake air cooler is disposed more downstream along said intake path than the connecting point to said burned gas discharging path.

4. An internal combustion engine having a combustion heater according to claim 3, wherein said intake path includes a bypass passageway for bypassing said intake air cooler, and the burned gas of said combustion heater is led to said internal combustion engine body via said bypass passageway, when said internal combustion engine is in the predetermined operating state.

5. An internal combustion engine having a combustion heater according to claim 4, further comprising:

a burned gas flow direction switching device for leading the burned gas of said combustion heater to said bypass passageway.

6. An internal combustion engine having a combustion heater according to claim 5, wherein said burned gas flow direction switching device is constructed of a valve member for closing said bypass passageway and a rotary shaft thereof, and opens and closes said bypass passageway corresponding to when said internal combustion engine is in the predetermined operating state and when not, by the rotation of said valve member around said rotary shaft.

7. An internal combustion engine having a combustion heater according to claim 4, wherein said by passageway includes a burned gas flow direction switching device at a connecting point of an upstream open end located upstream along the bypass passageway to the intake path, for switching the flow direction of the burned gas.

8. An internal combustion engine having a combustion heater according to claim 6, wherein said bypass passageway bypasses the intake air cooler in a state that an upstream end of the bypass passageway is connected to the burned gas discharging path and a downstream end is connected to the intake path.

9. An internal combustion engine having a combustion heater according to claim 8, wherein said burned gas flow direction switching device is attached to the upstream end of the bypass passageway.

10. An internal combustion engine having a combustion heater according to claim 1, wherein said intake air passing through the intake path is branched, at the connecting point with the air supply path, to the intake air flowing into the air supply path and the intake air continuously flowing through the intake path without branching.

11. An internal combustion engine having a combustion heater according to claim 1, further comprising:

heater control means for stopping an operation of said combustion heater at a non-cold time.

12. An internal combustion engine having a combustion heater comprising:

a combustion chamber body;

an air supply path for supplying said combustion chamber body with the air for combustion;

a fuel supply path for supplying said combustion chamber body with a combustion fuel;

an ignition device for igniting the combustion fuel supplied into said combustion chamber body via said fuel supply path; and a burned gas discharging path for discharging, out of said combustion chamber body, a burned gas emitted from the combustion fuel burned within said combustion chamber body upon the ignition by said ignition device, said combustion heater operating when said internal combustion engine is in a predetermined operating state and increasing temperatures of engine related elements, wherein said combustion heater is connected in bypass to an intake path of said internal combustion engine through said air supply path and said burned gas discharging path, a supercharger is installed in a portion along said intake path other than between a connecting point to said air supply path and a connecting point to said burned gas discharging path, said combustion heater is disposed more downstream along said intake path than the installed position of said supercharger, and an intake air cooler for cooling the intake air within said intake path holding heat due to pressurization by said supercharger is installed along said intake path at a portion other than between the connecting point to said air supply path and the connecting point to said burned gas discharging path.

13. An internal combustion engine having a combustion heater according to claim 12, wherein the burned gas emitted from the combustion heater is caused to flow to the intake path through the burned gas discharging path, when the internal combustion engine is in the predetermined operating state.

14. An internal combustion engine having a combustion heater according to claim 12, wherein said intake air cooler is disposed more upstream along said intake path than the connecting point to said burned gas discharging path.

15. An internal combustion engine having a combustion heater comprising:

a combustion chamber body;

an air supply path for supplying said combustion chamber body with the air for combustion;

a fuel supply path for supplying said combustion chamber body with a combustion fuel;

an ignition device for igniting the combustion fuel supplied into said combustion chamber body via said fuel supply path; and a burned gas discharging path for discharging, out of said combustion chamber body, a burned gas emitted from the combustion fuel burned within said combustion chamber body upon the ignition by said ignition device, said combustion heater operating when said internal combustion engine is in a predetermined operating state and increasing temperatures of engine related elements, wherein said combustion heater is connected in bypass to an intake path of said internal combustion engine through said air supply path and said burned gas discharging path, and including an air blow fan, a supercharger is installed in a portion along said intake path other than between a connecting point to said air supply path and a connecting point to said burned gas discharging path, and the burned gas emitted from the combustion heater is caused to flow to the intake path through the burned gas discharging path, when the internal combustion engine is in the predetermined operating state.

16. An internal combustion engine having a combustion heater according to claim 15, wherein said combustion heater is disposed more upstream along said intake path than the installed position of said supercharger.

17. An internal combustion engine having a combustion heater comprising:

a combustion chamber body;

an air supply path for supplying said combustion chamber body with the air for combustion;

a fuel supply path for supplying said combustion chamber body with a combustion fuel;

an ignition device for igniting the combustion fuel supplied into said combustion chamber body via said fuel supply path; and a burned gas discharging path for discharging, out of said combustion chamber body, a burned gas emitted from the combustion fuel burned within said combustion chamber body upon the ignition by said ignition device, said combustion heater operating when said internal combustion engine is in a predetermined operating state and increasing temperatures of engine related elements, wherein said combustion heater is connected in bypass to an intake path of said internal combustion engine through said air supply path and said burned gas discharging path, and including an air blow fan in communication with said air supply path, a supercharger is installed in a portion along said intake path other than between a connecting point to said air supply path and a connecting point to said burned gas discharging path, and said combustion heater is disposed more downstream along said intake path than the installed position of said supercharger.

* * * * *